(12) United States Patent
Lee et al.

(10) Patent No.: US 7,824,621 B2
(45) Date of Patent: Nov. 2, 2010

(54) APPARATUS AND METHOD FOR EJECTING DROPLETS USING CHARGE CONCENTRATION AND LIQUID BRIDGE BREAKUP

(75) Inventors: Beom-seok Lee, Yongin-si (KR); Jeong-gun Lee, Yongin-si (KR); Hye-jung Cho, Yongin-si (KR); In-seok Kang, Pohang-si (KR); Jae-suk Moon, Pohang-si (KR); Jin-seok Hong, Pohang-si (KR)

(73) Assignee: Samsung Electronics Co., Ltd. (KR)

( * ) Notice: Subject to any disclaimer, the term of this patent is extended or adjusted under 35 U.S.C. 154(b) by 382 days.

(21) Appl. No.: 11/970,301

(22) Filed: Jan. 7, 2008

(65) Prior Publication Data
US 2008/0225087 A1 Sep. 18, 2008

(30) Foreign Application Priority Data
Jan. 23, 2007 (KR) .................... 10-2007-0007234

(51) Int. Cl.
*B01L 3/02* (2006.01)
*B01L 99/00* (2010.01)
(52) U.S. Cl. ................ 422/100; 422/103; 436/174; 436/180
(58) Field of Classification Search ............... 422/100, 422/103; 436/174, 180
See application file for complete search history.

(56) References Cited

U.S. PATENT DOCUMENTS

| 4,503,442 A | * | 3/1985 | Barbero et al. | 347/55 |
| 4,595,938 A | * | 6/1986 | Conta et al. | 347/55 |
| 6,962,782 B1 | * | 11/2005 | Livache et al. | 435/6 |
| 7,615,141 B2 | * | 11/2009 | Schwartz et al. | 205/133 |

* cited by examiner

Primary Examiner—Brian J Sines
(74) Attorney, Agent, or Firm—Cantor Colburn LLP

(57) ABSTRACT

Disclosed is an apparatus and method for ejecting droplets using charge concentration and liquid bridge breakup. The droplet ejection apparatus includes a reservoir storing a liquid; a capillary nozzle having a lower end submerged in the liquid stored in the reservoir and an upper end exposed outside the surface of the liquid, the capillary nozzle transferring the liquid to the upper end using capillary force; a potentiostat for applying a voltage to the liquid; a substrate mount on which a substrate is disposed to face the upper end of the capillary nozzle; and a distance adjusting unit for reciprocatingly moving the substrate between first and second positions with respect to the capillary nozzle, wherein the first position denotes a position where a distance between the upper end of the capillary nozzle and the surface of the substrate is less than a effective distance.

21 Claims, 13 Drawing Sheets

APPARATUS AND METHOD FOR EJECTING DROPLETS USING CHARGE CONCENTRATION AND LIQUID BRIDGE BREAKUP

CROSS-REFERENCE TO RELATED PATENT APPLICATION

This application claims priority to Korean Patent Application No. 10-2007-0007234, filed on Jan. 23, 2007, and all the benefits accruing therefrom under 35 U.S.C. §119, the contents of which are herein incorporated by reference in its entirety.

BACKGROUND OF THE INVENTION

1. Field of the Invention

This disclosure relates to an apparatus and method for ejecting droplets, and more particularly, to an apparatus and method for ejecting droplets onto a substrate using electrical charge concentration between a capillary nozzle and a substrate and liquid bridge breakup.

2. Description of the Related Art

In general, droplet ejection apparatuses are used for ejecting very small droplets of liquid onto a substrate or recording paper. Various droplet ejection mechanisms, including the ink-jet mechanism of an ink-jet printer, can be applied in droplet ejection apparatuses. However, an ink-jet mechanism, which applies heat to a liquid (such as an ink), is not suitable for ejecting droplets of a liquid that will be subjected or are susceptible to thermal modification. In particular, when manufacturing biochips, there is a need for a liquid droplet ejection apparatus capable of ejecting droplets of a liquid containing bio-molecules, such as nucleic acids, protein, bio cells, viruses or bacteria, without using heat.

BRIEF SUMMARY OF THE INVENTION

Disclosed in an embodiment is an apparatus and a method for ejecting droplets using electrical charge concentration between a capillary nozzle and a substrate and liquid bridge breakup. The disclosed apparatus and method can provide excellent repeatability and reproducibility without being significantly affected by the electrical characteristics or conductive properties of the liquid to be printed on the substrate.

Disclosed herein is an apparatus for ejecting a droplet using charge concentration and liquid bridge breakup, the apparatus comprising a reservoir for storing a liquid; a capillary nozzle having a lower end submerged in the liquid stored in the reservoir and an upper end exposed above the surface of the liquid, the capillary nozzle transferring the liquid from the lower end to the upper end using capillary force; a potentiostat for applying a voltage to the liquid; a substrate mount; a substrate on which the liquid is to be printed disposed on the substrate mount so a surface of the substrate faces the upper end of the capillary nozzle and the substrate mount is disposed on the opposite surface of the substrate; and a distance adjusting unit, the distance adjusting unit reciprocatingly moving the substrate between a first position and a second position with respect to the upper end of the capillary nozzle, wherein the first position is a position where the distance between the upper end of the capillary nozzle and the surface of the substrate is less than an effective distance, where the effective distance is the maximum distance a liquid bridge can form between the capillary nozzle and the substrate upon application of an applied voltage, and the second position denotes a position where the distance between the upper end of the capillary nozzle and the surface of the substrate is greater than the effective distance so as to destroy the liquid bridge.

The distance adjusting unit can sequentially move the substrate to the first, second, first, and second positions with respect to the capillary nozzle and the potentiostat can apply a voltage when the substrate is located at a position between the first position and a position corresponding to the effective distance. The reservoir and the capillary nozzle can be fixed and the distance adjusting unit can move the substrate mount to adjust the distance between the substrate and the capillary nozzle. Alternatively, the substrate mount can be fixed and the distance adjusting unit can move the reservoir and the capillary nozzle together to adjust the distance between the substrate and the capillary nozzle. In an alternative embodiment, the distance adjusting unit can simultaneously move the substrate mount, the reservoir, and the capillary nozzle to adjust the distance between the substrate and the capillary nozzle.

The distance adjusting unit can include a speed-controllable motor.

The capillary nozzle can comprise a non-conductive material and the potentiostat can apply a voltage to the liquid through an electrode, where the electrode is in electrical communication with the liquid stored in the reservoir. In an alternative embodiment, the capillary nozzle can comprise a conductive material and the potentiostat can be in electrical communication with the capillary nozzle. In an alternative embodiment, the capillary nozzle can comprise a non-conductive material and can comprise a conductive material layer formed on an inside wall thereof and the potentiostat can be in electrical communication with the conductive material layer.

The capillary nozzle can extend upward, wherein the reservoir can be disposed at a lower end of the capillary nozzle and the substrate mount can be disposed so as to face an upper end of the capillary nozzle. A plurality of capillary nozzles can be arranged in one reservoir and the potentiostat can apply a voltage to the liquid through an electrode, the electrode in electrical communication with the liquid stored in the reservoir.

In an alternative embodiment, disclosed is an apparatus for ejecting a droplet using charge concentration and liquid bridge breakup, the apparatus comprising a plurality of droplet ejecting modules, each droplet ejecting module comprising a reservoir for storing a liquid, a capillary nozzle, the capillary nozzle having a lower end submerged in the liquid stored in the reservoir and an upper end exposed above the surface of the liquid, the capillary nozzle transferring the liquid from the lower end to the upper end using a capillary force, wherein the capillary nozzles are arranged at substantially the same height; a potentiostat for applying a voltage to the liquid stored in each reservoirs in the droplet ejecting modules, the potentiostat in electrical communication with the liquid; a substrate mount, a substrate on which the liquid is to be printed disposed on the substrate mount, the substrate disposed so that the face of the substrate on which liquid will be printed to faces the upper ends of the capillary nozzles; and a distance adjusting unit, the distance adjusting unit reciprocatingly moving the substrate between a first and a second position with respect to the capillary nozzles, wherein the first position denotes a position where a distance between the upper end of the capillary nozzles and the surface of the substrate is less than a effective distance, where the effective distance is the maximum distance a liquid bridge can form between the capillary nozzles and the substrate upon application of an applied voltage, and the second position denotes a position at which the distance between the upper end of the capillary nozzles and the surface of the substrate is greater than the effective distance so as to destroy the liquid bridge.

The distance adjusting unit can sequentially move the substrate to the first, second, first, and second positions with respect to the capillary nozzles, and the potentiostat can apply a voltage when the substrate is located at a position between the first position and a position corresponding to the effective distance.

In an alternative embodiment, the location of the plurality of droplet ejecting modules can be fixed and the distance adjusting unit can move the substrate mount to adjust the distance between the substrate and the capillary nozzles. Alternatively, the substrate mount can be fixed and the distance adjusting unit can move the plurality of droplet ejecting modules to adjust the distance between the substrate and the capillary nozzles. In an alternative embodiment, the distance adjusting unit can simultaneously move the substrate mount, the reservoir, and the capillary nozzles to adjust the distance between the substrate and the capillary nozzles. The distance adjusting unit can include a speed-controllable motor.

Each of the capillary nozzles can comprise a non-conductive material and the potentiostat can apply a voltage to the liquid through an electrode that is in electrical communication with the liquid stored in each of the reservoirs. In an alternative embodiment, each of the capillary nozzles can comprise a conductive material and the potentiostat can be in electrical communication with each of the capillary nozzles. In an alternative embodiment, each of the capillary nozzles can comprise a non-conductive material and can comprise a conductive material layer formed on an inside wall thereof and the potentiostat can be in electrical communication with the conductive material layer of each capillary nozzle.

The capillary nozzle in each droplet ejecting module can extend upward, wherein the reservoir in each module is disposed at a lower end of the capillary nozzle and the substrate can be disposed so as to face the upper end of each capillary nozzle and wherein the substrate is disposed above the capillary nozzles. Each of the droplet ejecting modules can include a plurality of capillary nozzles arranged in the reservoir of each of the droplet ejecting modules and the potentiostat can apply a voltage to the liquid through an electrode, where the electrode is in electrical communication with the liquid stored in the reservoir.

In an alternative embodiment, disclosed is a method of ejecting a droplet using charge concentration and liquid bridge breakup, the method comprising moving a substrate to a first position with respect to an upper end of a capillary nozzle, where the capillary nozzle has a lower end submerged in a liquid and wherein the first position is a position at which a distance between the substrate and the upper end of the capillary nozzle is less than an effective distance; applying a voltage to the liquid; moving the substrate to a second position with respect to the upper end of the capillary nozzle, and ejecting a droplet onto the substrate using charge concentration and liquid bridge breakup, wherein the second position is a position at which the distance between the substrate and the upper end of the capillary nozzle is greater than the effective distance. The effective distance can be a maximum distance a liquid bridge can form due to charge concentration between the capillary nozzle and the substrate when a voltage is applied to the liquid.

The speed at which the substrate moves from the first position to the second position with respect to the upper end of the capillary nozzle can be controlled to adjust the size of a droplet to be printed on the substrate.

A voltage applied during formation of the liquid bridge can be one cycle of a sine wave pulse.

The substrate can be moved to change the position of the substrate with respect to the upper end of the capillary nozzle. Alternatively, the capillary nozzle can be moved to change the position of the substrate with respect to the upper end of the capillary nozzle. Alternatively, the substrate and the capillary nozzle can be moved in concert to change the position of the substrate with respect to the upper end of the capillary nozzle.

In an alternative embodiment, disclosed is a printed substrate, the printed substrate fabricated using the above disclosed apparatus. In an embodiment, a printed substrate can be fabricated using the above disclosed method.

In an alternative embodiment, disclosed is an array, the array disposed on a substrate, wherein the array is fabricated using the apparatus disclosed above. In an embodiment the array is fabricated using the method disclosed above.

In an alternative embodiment, disclosed is a bio-molecule array, the bio-molecule array disposed on a substrate, wherein the bio-molecule array is fabricated using the apparatus disclosed above. In an embodiment the bio-molecule array is fabricated using the method disclosed above. The bio-molecule can comprise a nucleic acids, protein, bio cells, viruses, bacteria, or the like, or a combination comprising at least one of the foregoing bio-molecules.

BRIEF DESCRIPTION OF THE DRAWINGS

The above and other features and advantages of the disclosed embodiments will become more apparent by describing in detail exemplary embodiments thereof with reference to the attached drawings in which.

Figure 1:
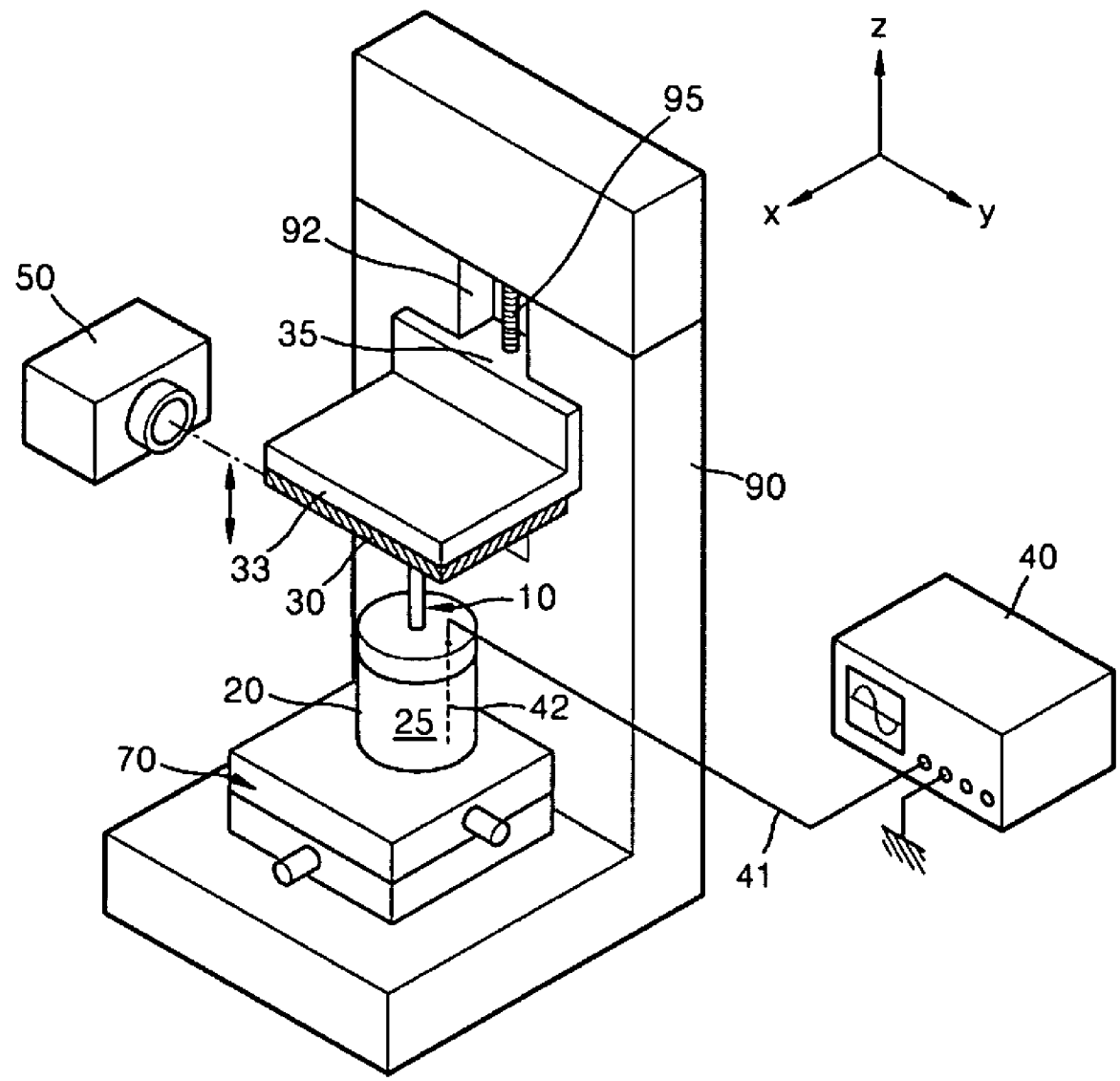
FIG. 1 is a perspective view of an exemplary droplet ejection apparatus.

The detailed description explains the preferred embodiments, together with advantages and features, by way of example with reference to the drawings.

DETAILED DESCRIPTION OF THE INVENTION

The disclosed embodiments will now be described more fully with reference to the accompanying drawings, in which exemplary embodiments are shown.

It will be understood that when an element is referred to as being "on" another element, it can be directly on the other element or intervening elements can be present therebetween. In contrast, when an element is referred to as being "disposed on", "deposited on" or "formed on" another element, the elements are understood to be in at least partial contact with each other, unless otherwise specified.

The terminology used herein is for the purpose of describing particular embodiments only and is not intended to be limiting of the disclosed embodiments. As used herein, the singular forms "a", "an" and "the" are intended to include the plural forms as well, unless the context clearly indicates otherwise. Thus the use of the terms a, an, etc. do not denote a limitation of quantity, but rather denote the presence of at least one of the referenced item. The use of the terms "first", "second", and the like do not imply any particular order, but are included to identify individual elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the pertinent art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and the thicknesses of layers and regions are exaggerated for clarity.

This written description uses examples to aid description, including description of the best mode, and also to enable any person skilled in the art to practice that disclosed, including making and using any devices or systems and performing any incorporated methods. The patentable scope is defined by the claims, and can include other examples that occur to those skilled in the art. Such other examples are intended to be within the scope of the claims if they have elements that do not differ from the literal language of the claims, or if they include equivalent elements with insubstantial differences from the literal language of the claims.

FIG. 1 is a perspective view of a liquid droplet ejection apparatus. Referring to FIG. 1, the disclosed droplet ejection apparatus comprises a substrate 30 onto which a droplet of a liquid 25 can be ejected, a reservoir 20 storing the liquid 25, a capillary nozzle 10 having a lower end submerged in the liquid 25 and an upper end exposed above the surface of the liquid 25, and a potentiostat 40 for applying a voltage to the liquid 25. The substrate 30 is disposed on a substrate mount 33 so that the substrate is disposed opposite the upper end of the capillary nozzle 10. The substrate 30 therefore has the substrate mount 33 disposed on a surface of the substrate 30 that is opposed to the surface that faces the capillary nozzle 10. The substrate 30 is a medium on which droplets can be ejected and can be a rigid plate formed of silicon, glass, metal, plastic, or the like, or a combination comprising at least one of the foregoing rigid media. In one embodiment, the substrate can be a flexible sheet formed of paper, a polymer film, or the like, or a combination comprising at least one of the foregoing flexible sheets. A droplet can be ejected from the upper end of the capillary nozzle 10 onto the substrate 30. When the droplet ejection apparatus of the present embodiment is used in manufacturing biochips, such as DNA microarrays, the surface of the substrate 30 can be coated with an adhesion promoter such as an amine group, a carboxyl group, streptavidine, biotin, thiol, Poly-L-Lysine, or the like, or a combination comprising at least one of the foregoing adhesion promoters, to improve the adhesion of the bio-molecules contained in the liquid 25 to the substrate.

As illustrated in FIG. 1, the capillary nozzle 10 can extend upwards, away from and substantially perpendicular (in a z-axis direction) to a horizontal base of the reservoir 20. Thus the substrate 30 can be disposed to face the upper end of the capillary nozzle 10. In an alternative embodiment, the capillary nozzle 10 can be disposed vertically or inclined at an angle to the base of the reservoir 20. When the capillary nozzle 10 is disposed vertically in reservoir 20, the length of the portion of the capillary nozzle 10 exposed above the surface of the liquid 25 can be selected so that capillary forces draw the liquid 25 upward from the reservoir 20 into the capillary nozzle 10.

The capillary nozzle 10 can comprise an electrically conductive or non-conductive material. Exemplary conductive materials for the capillary nozzle 10 include metals, such as gold, platinum, copper, aluminum, or the like, or a combination comprising at least one of the foregoing metals. Exemplary non-conductive materials for the capillary nozzle 10 include non-conductive polymers, such as glass, polycarbonate, polypropylene, or the like, or a combination comprising at least one of the foregoing polymers. When the capillary nozzle 10 is formed of a conductive material, the potentiostat 40 can apply a voltage to the liquid 25 through a lead wire (not shown) in electrical communication with the capillary nozzle 10. When the capillary nozzle 10 comprises a non-conductive material (15 in FIG. 3), the potentiostat 40 can apply a voltage to the liquid 25 through an electrode 42 submerged in or in electrical communication with the liquid 25 stored in the reservoir 20, as illustrated in FIG. 1 (hereinafter the electrode 42 can be referred to as the "immersion electrode"). The capillary nozzle 10 can comprise a non-conductive wall with a conductive material (16 in FIG. 4) disposed on an inner surface of the wall. Referring to FIG. 4, in this case, the potentiostat 40 can apply a voltage to the liquid 25 through a lead wire 41 directly connected to or in electrical communication with the conductive material 16.

The potentiostat 40 has one terminal connected to the ground and the other terminal in electrical communication with the electrode 42 for applying a voltage. The potentiostat 40 can be any type of device that can apply a voltage pulse having a predetermined waveform and magnitude. The waveform and magnitude of the applied voltage can be varied to accommodate the characteristics of the particular liquid to be printed, such as its viscosity and electrical conductivity, application parameters, such as printed dot diameter, and apparatus parameters such as the degree of submergence of the capillary nozzle 10. The waveform can comprise various shapes of pulses including a square wave, sine wave, triangle wave, or the like, or a wave obtained by superimposing at least two of the aforementioned waves, or a wave comprised of at least one of the foregoing waves.

The droplet ejection apparatus further comprise a distance adjusting unit that changes the distance between the substrate 30 and the upper end of the capillary nozzle 10 at a selected rate. In an embodiment, the distance adjusting unit can be a mechanism for reciprocating the substrate mount 33 up and down (in the z-axis direction). The mechanism can include a linear geared motor (not shown) or linear motor (not shown) for moving the substrate mount 33 using a gear 95. Referring to FIG. 1, a portion of the substrate mount 33 is in communication with the gear 95 to receive power so that it can move along a guide 92 of a frame 90. In an alternative embodiment, the distance adjusting mechanism can be configured so that the capillary nozzle 10 and the reservoir 20 move together with the substrate mount 33 being fixed, or so that the substrate mount 10 and the capillary nozzle 10 can move at the same time. Since the configuration of the distance adjusting mechanism will be obvious to those of ordinary skill in the art, a detailed explanation thereof will not be given.

The reservoir 20 with the capillary nozzle 10 can be disposed on a movable mount 70. The movable mount 70 can horizontally move the reservoir 20 in the x-y plane so as to move the position where a droplet is ejected on to the substrate 30. The droplet ejection apparatus of the embodiment can further includes a camera 50 for monitoring the ejection of droplets.

Figure 2:
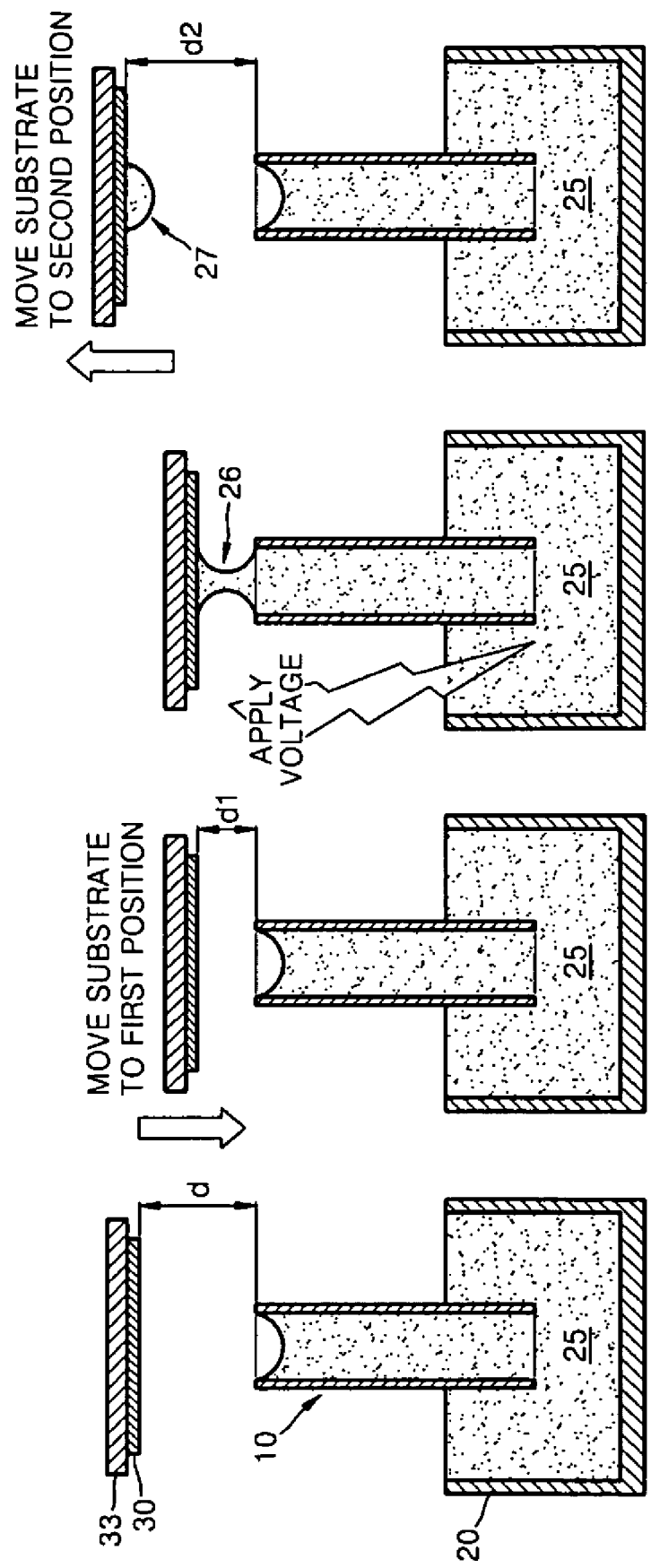
FIG. 2 is a series of schematic diagrams illustrating the operation of an exemplary droplet ejection apparatus over time.

FIG. 2 is a series of schematic diagrams illustrating the operation of the droplet ejection apparatus of FIG. 1 over time. The features of the droplet ejection apparatus as well as a method for ejecting droplets will now be described with reference to FIGS. 1 and 2. Referring to FIGS. 1 and 2, the liquid 25 stored in the reservoir 20 can be transferred from the lower end of capillary nozzle 10 to the upper end of the capillary nozzle 10, which is above the surface of the liquid 25, by a capillary force. The liquid 25 reaching the upper end of the capillary nozzle 10 contacts to the upper end of the capillary nozzle 10 due to surface tension. The shape of the meniscus of the liquid 25 contacting the upper end can vary depending on the contact angle between the liquid 25 and the capillary nozzle 10.

Referring to FIG. 2, the liquid 25 is supplied to the upper end of the capillary nozzle 10, and the substrate 30 can move in a direction indicated by the arrow, in concert with the substrate mount 33. In this case, the substrate 30 moves to a first position so that the distance d1 between the surface of the substrate 30 and the upper end of the capillary nozzle 10 is less than an effective distance. The effective distance refers to the maximum distance that promotes the formation of a liquid bridge 26 between the capillary nozzle 10 and the substrate 30 when a selected voltage is applied to the liquid 25. The effective distance is determined by various factors, including the characteristics of the liquid 25, the magnitude and waveform of the applied voltage, and the diameter of the capillary nozzle 10.

When the potentiostat 40 applies a voltage to liquid 25 after the substrate 30 moves to the first position, an electric charge of a certain polarity can concentrate at the surface of the liquid 25 contacting the upper end of the capillary nozzle 10 while an electric charge having an opposite polarity is induced in the surface of the substrate 30 proximate to the upper end of the capillary nozzle 10. An electric attractive force, specifically a Coulomb force, is then generated between the surface of the liquid 25 contacting to the upper end of the capillary nozzle 10 and the surface of substrate 30, and thus changes the surface of the liquid 25 to form the liquid bridge 26 as the liquid 25 contacts the surface of the substrate 30.

After, or at the same time the liquid bridge 26 is formed, the substrate 30 gradually moves away from the upper end of the capillary nozzle 10 to a second position. When the substrate 30 is at the second position, the distance d2 between the substrate 30 and the upper end of the capillary nozzle 10 is greater than the minimum distance to destroy the liquid bridge 26. That is, while the substrate 30 moves to the second position, the liquid bridge 26 is destroyed so that a droplet 27 of the liquid 25 remains on the substrate 30.

Figure 3:
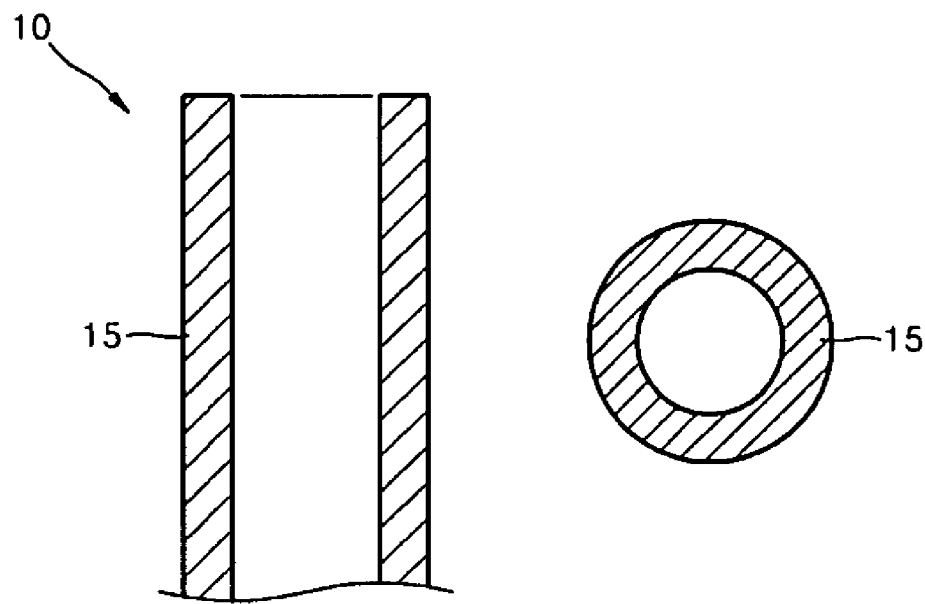
FIG. 3 illustrates an exemplary non-conductive capillary nozzle
Figure 4:
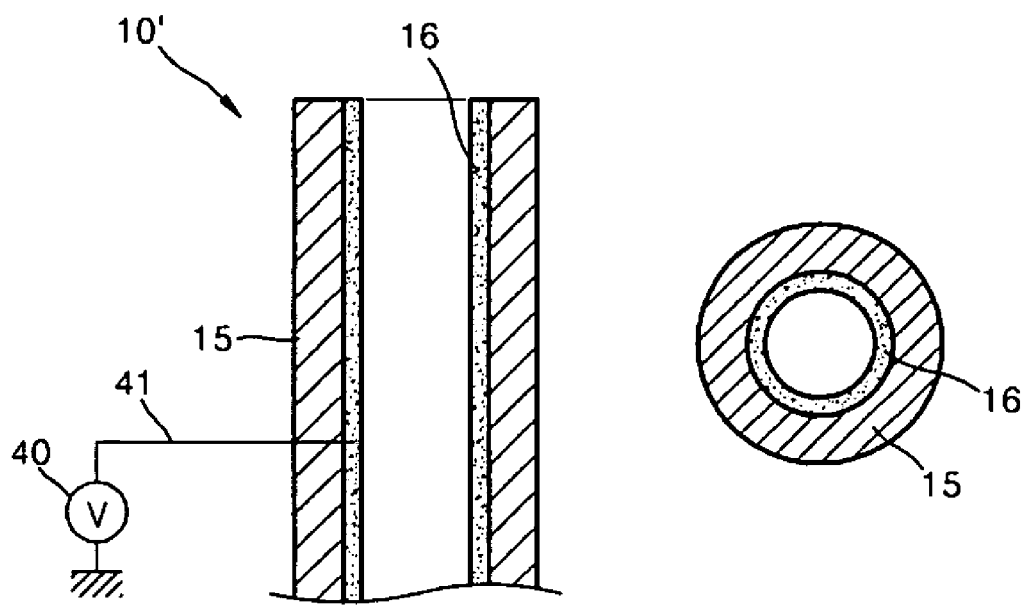
FIG. 4 illustrates an exemplary non-conductive capillary nozzle having a conductive material layer formed on an inside wall of its body.

FIG. 3 illustrates an exemplary embodiment of the capillary nozzle 10 comprising a non-conductive material. The diagram on the left of FIG. 3 illustrates a longitudinal cross-section of exemplary the capillary nozzle 10. The diagram on the right of FIG. 3 illustrates a horizontal cross-section of the upper end of the capillary nozzle 10. Referring to FIG. 3, the capillary nozzle 10 is a capillary tube having a concentric circular inner and outer surfaces. The capillary nozzle 10 can have any shape as long as it can transfer a liquid using a capillary force. The capillary nozzle 10 can have a body 15 formed of a non-conductive material. Exemplary non-conductive materials include glass, polycarbonate, polypropylene, plastic materials, or the like, or a combination comprising at least one of the foregoing non-conductive materials. In this case, a voltage is applied to the liquid 25 through the immersion electrode 42. Alternatively, the capillary nozzle 10 can comprise a conductive material. Exemplary conductive materials include metals, conductive polymers, or the like, or a combination comprising at least one of the foregoing conductive materials, where the conductive materials are resistant to corrosion from the liquid 25 to be printed. If the capillary nozzle 10 comprises a conductive material, it can be in electrical communication with the potentiostat 40.

Figure 5:
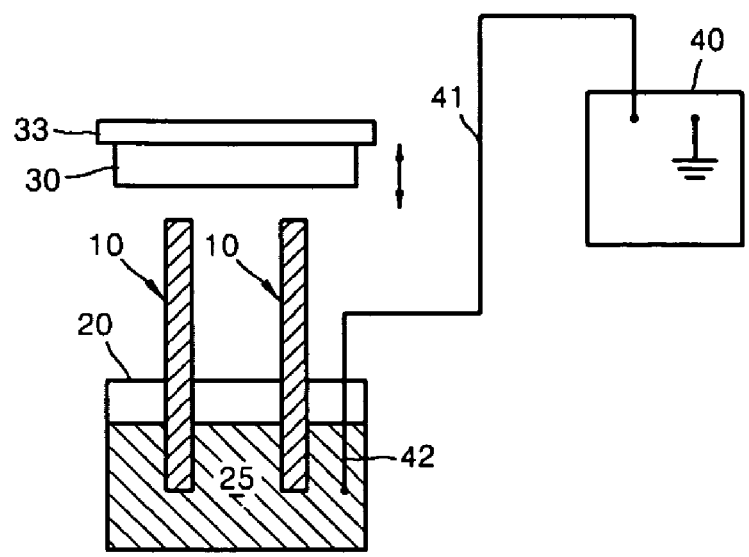
FIG. 5 illustrates an exemplary droplet ejection apparatus including one reservoir and two capillary nozzles.

FIG. 4 illustrates a non-conductive capillary nozzle 10' having a conductive material 16 disposed on an inside wall of its body 15. The diagram on the left of FIG. 4 illustrates a longitudinal cross-section of the capillary nozzle 10'. The diagram on the right of FIG. 4 illustrates a horizontal cross-section of the upper end of capillary nozzle 10'. Referring to FIG. 4, the body 15 of the capillary nozzle 10' comprises a non-conductive material and the conductive material 16 is disposed on an inside wall of the body 15. For example, the conductive material 16 can comprise Indium Tin Oxide (ITO), or the like. The conductive material 16 can be in electrical communication with the potentiostat 40 via a lead wire 41. FIG. 5 illustrates a droplet ejection apparatus including one reservoir 20 and two capillary nozzles 10 according to an alternative embodiment. Disclosed is a droplet ejection apparatus with two capillary nozzles 10 located at substantially the same height. In the disclosed embodiment, a potentiostat 40 can apply electrical charge to a liquid 25 in the reservoir 20 through a lead wire 41 and an immersion electrode 42, thus unexpectedly enabling ejection of droplets from the capillary nozzles 10 without the need for wires to be coupled to each of the capillary nozzles 10.

Figure 6:
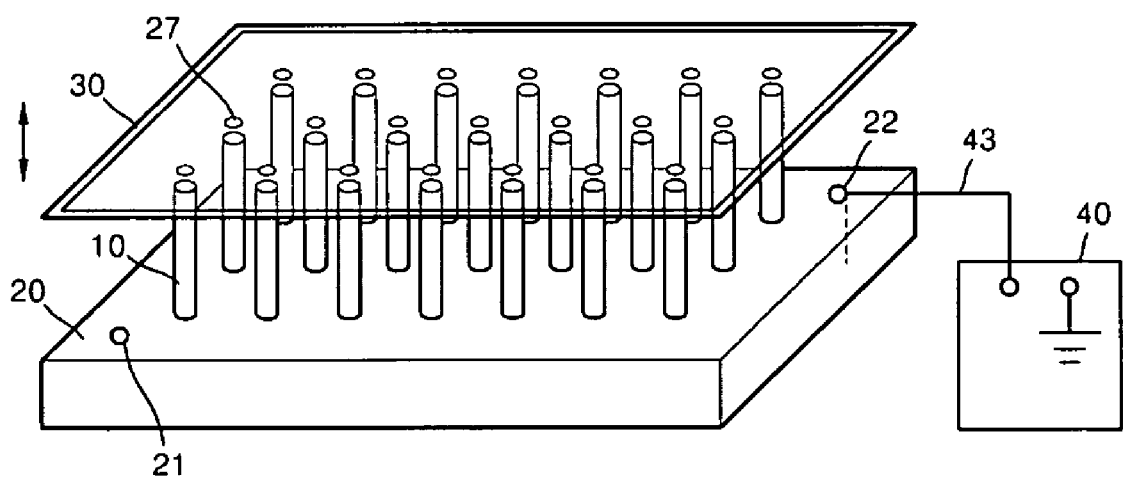
FIG. 6 illustrates an exemplary droplet ejection apparatus, including one reservoir and a plurality of capillary nozzles.

FIG. 6 illustrates a droplet ejection apparatus including one reservoir 20 and a plurality of capillary nozzles 10, according to an alternative embodiment. The capillary nozzles 10 are arranged in the reservoir 20 at substantially the same height in a selected pattern. Droplets 27 are printed in a selected pattern according to the selected pattern of the capillary nozzles 10. The reservoir 20 includes inlet and outlet ports 21 and 22 respectively for receiving and discharging a liquid. A lead wire 43 in electrical communication with the potentiostat 40 can be in electrical communication with the liquid in the reservoir 20 through one or both of the inlet and outlet ports 21 and 22 (e.g., the outlet port 22). More specifically, the lead wire 43 can be in electrical communication with an electrode (not shown), which can be immersed in the liquid in the reservoir 20. The electrode can comprise any type of material and have a shape that can provide electrical conductivity and corrosion resistance against the liquid. Furthermore, the distance between the electrode and an upper end of each of the capillary nozzles can be approximately equal so the liquid bridges from each of the capillary nozzles 10 form uniformly. To apply a voltage to the liquid in this way, each of the capillary nozzles 10 can comprise an insulating material. This configuration reduces interaction among the capillary nozzles 10, thus allowing for integration of the capillary nozzles 10.

Referring to FIG. 6, the droplet ejection apparatus, according to an embodiment, can include a transparent substrate 30, without a substrate mount, to provide better visualization of the shape of the printed droplets 27. In an embodiment, the substrate 30 can be aligned horizontally to maintain substantially the same distance from each of the capillary nozzles 10, alternatively the substrate 30 can be tilted so the distance between the substrate 30 and each of the capillary nozzles 10 can vary. In an embodiment, the droplet ejection apparatus can be configured to prevent degradation of print quality due to the tilting of the substrate 30. Specifically, the likelihood of formation of a liquid bridge and the breakup of the liquid bridge can be enhanced by selecting the first and second positions (see FIG. 2) so as to include appropriate tolerances with respect to the effective distance.

Figure 7:
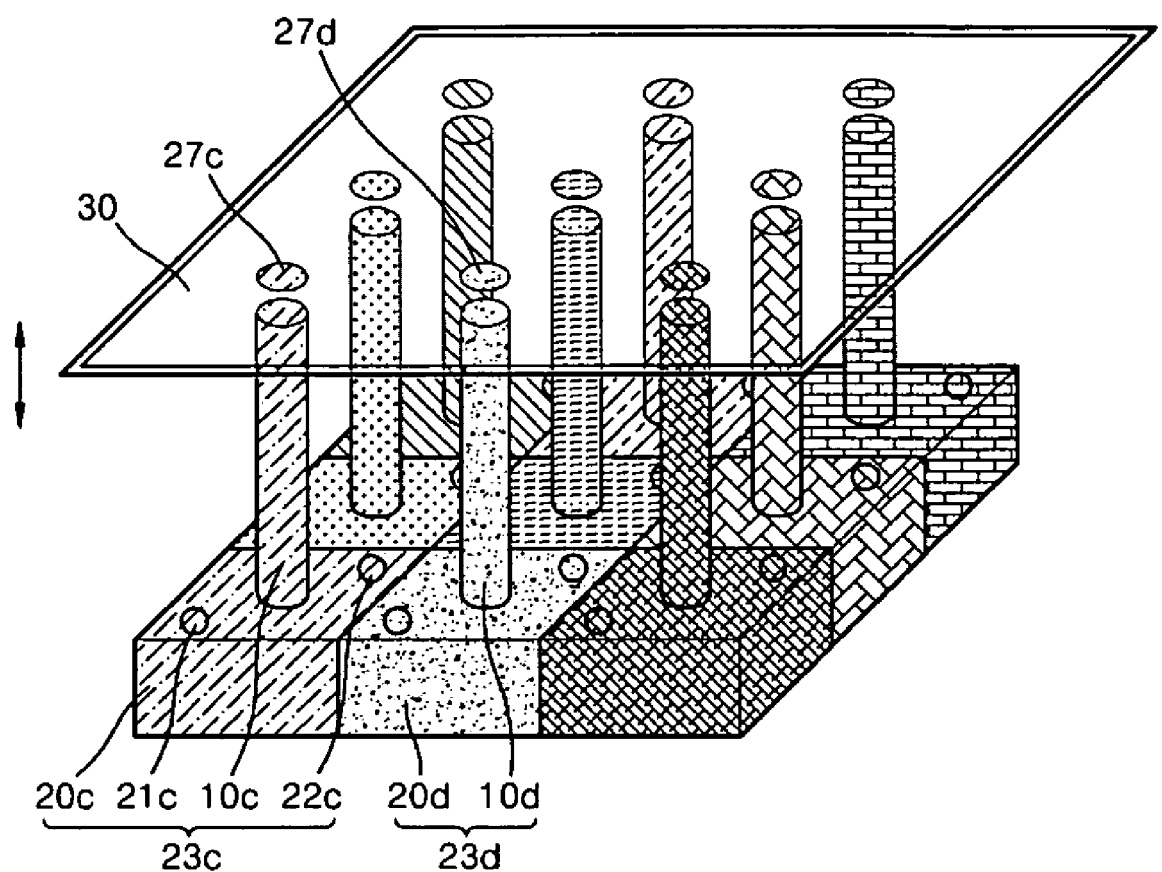
FIG. 7 illustrates an exemplary droplet ejection apparatus, including a plurality of droplet ejecting modules.

FIG. 7 illustrates a droplet ejection apparatus that comprises a plurality of droplet ejecting modules 23c and 23d, according to an alternative embodiment. The plurality of droplet ejecting modules 23c and 23d can be arranged on the same plane, thus the capillary nozzles 10c and 10d of the droplet ejecting modules 23c and 23d, respectively, can be at substantially the same height. Each of the droplet ejecting modules 23c and 23d include reservoirs 20c and 20d and the capillary nozzles 10c and 10d, respectively. The reservoir 20c of the droplet ejecting module 23c has inlet and outlet ports 21c and 22c. Similar to the droplet ejection apparatus illustrated in FIG. 1, a potentiostat can apply a voltage to a liquid stored in the reservoirs, including reservoirs 20c and/or 20d, through an electrode immersed in the liquid. Alternatively, a voltage can be applied to the liquid through the conductive material 16 of the capillary nozzle 10 as illustrated in FIG. 4. The droplet ejecting modules 23c and 23d enable printing of droplets 27c and 27d of liquids with different compositions and concentrations, respectively.

EXAMPLES

Two exemplary droplet ejection apparatuses, and droplets ejected by the droplet ejection apparatuses, will now be explained. The two droplet ejection apparatuses had the same configuration as the liquid droplet ejection apparatus of FIG. 1. Specifically, in detail, the first one of the two droplet ejection apparatuses employed a silicon substrate as the substrate 30, and the other employed an UV film-coated substrate as the substrate 30.

Figure 8:
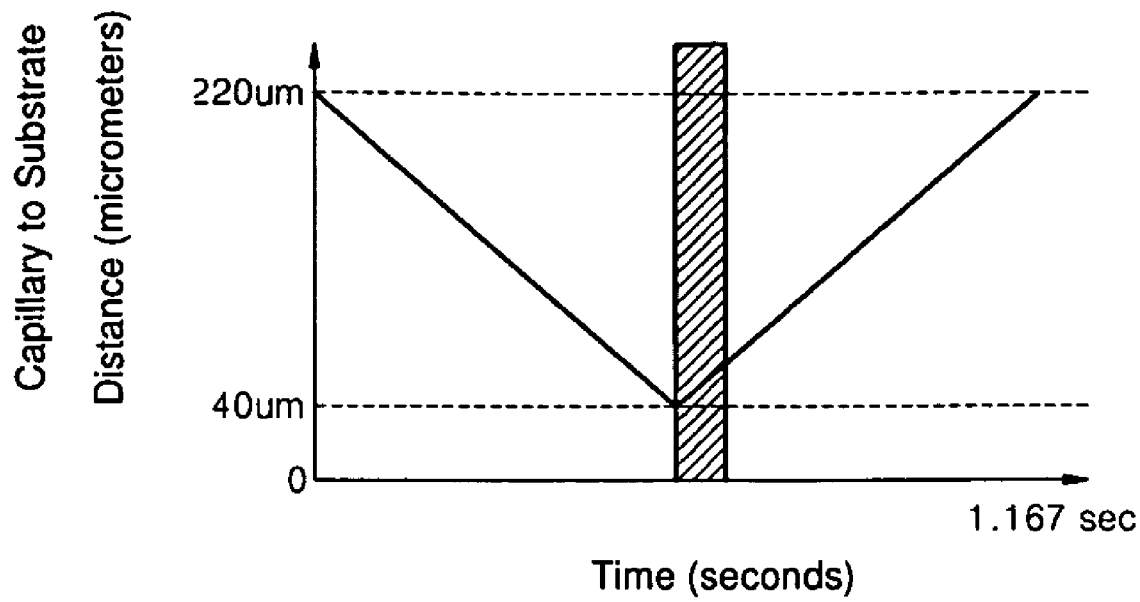
FIG. 8 is a graph illustrating a distance between a capillary nozzle and a substrate over time and the time when a voltage is applied in the exemplary droplet ejection apparatus of FIG. 1, and in an exemplary droplet ejection apparatus using a silicon substrate.
Figure 9:
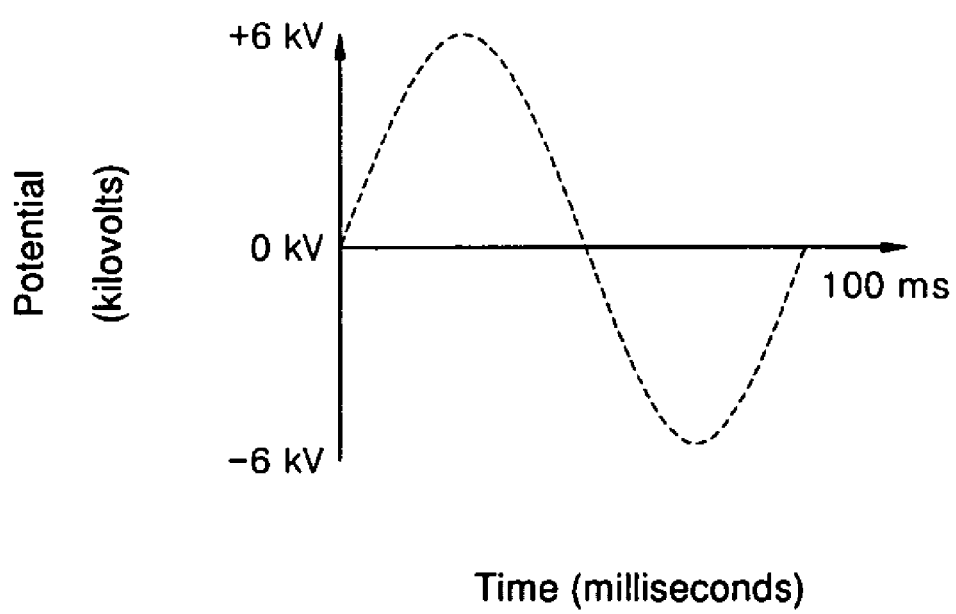
FIG. 9 is a graph showing an exemplary waveform of an applied voltage in the droplet ejection apparatus.

FIG. 8 is a graph illustrating the distance between the capillary nozzle 10 and the substrate 30 of a first exemplary embodiment over time and the time when a voltage was applied to the droplet ejection apparatus of FIG. 1 or a droplet ejection apparatus using a silicon substrate, according to an alternative exemplary embodiment. FIG. 9 is a graph showing the waveform of the applied voltage in the droplet ejection apparatus of the first exemplary embodiment. Referring to FIG. 8, the ordinate and abscissa denote the distance between the upper end of the capillary nozzle 10 and the surface of the substrate 30, and time, respectively. The shaded area on the graph indicates the time interval in which a voltage was applied by the potentiostat 40. The droplet ejection apparatus of the first exemplary embodiment had substantially the same configuration as the apparatus of FIG. 1. More specifically, according to the first exemplary embodiment, the capillary nozzle 10 of the ejection apparatus of the first exemplary embodiment was formed of stainless steel and had an outside diameter of about 460 micrometers ($\mu$m) and an inside diameter of about 230 micrometers ($\mu$m). The liquid 25 and the substrate 30 were a DNA solution (with buffer) and an amine-coated silicon substrate, respectively. Referring to FIG. 9, the potentiostat 40 of the droplet ejection apparatus of the first exemplary embodiment applied a one-cycle sine wave pulse with a maximum amplitude of about 12 kilovolts (kV) and a period of about 100 milliseconds (ms). The minimum and maximum distances d1 and d2 between the capillary nozzle 10 and the substrate 30, when the substrate 30 was at the first and second positions (in FIG. 2), were set to about 40 micrometers ($\mu$m) and about 220 micrometers ($\mu$m), respectively.

Figure 10:
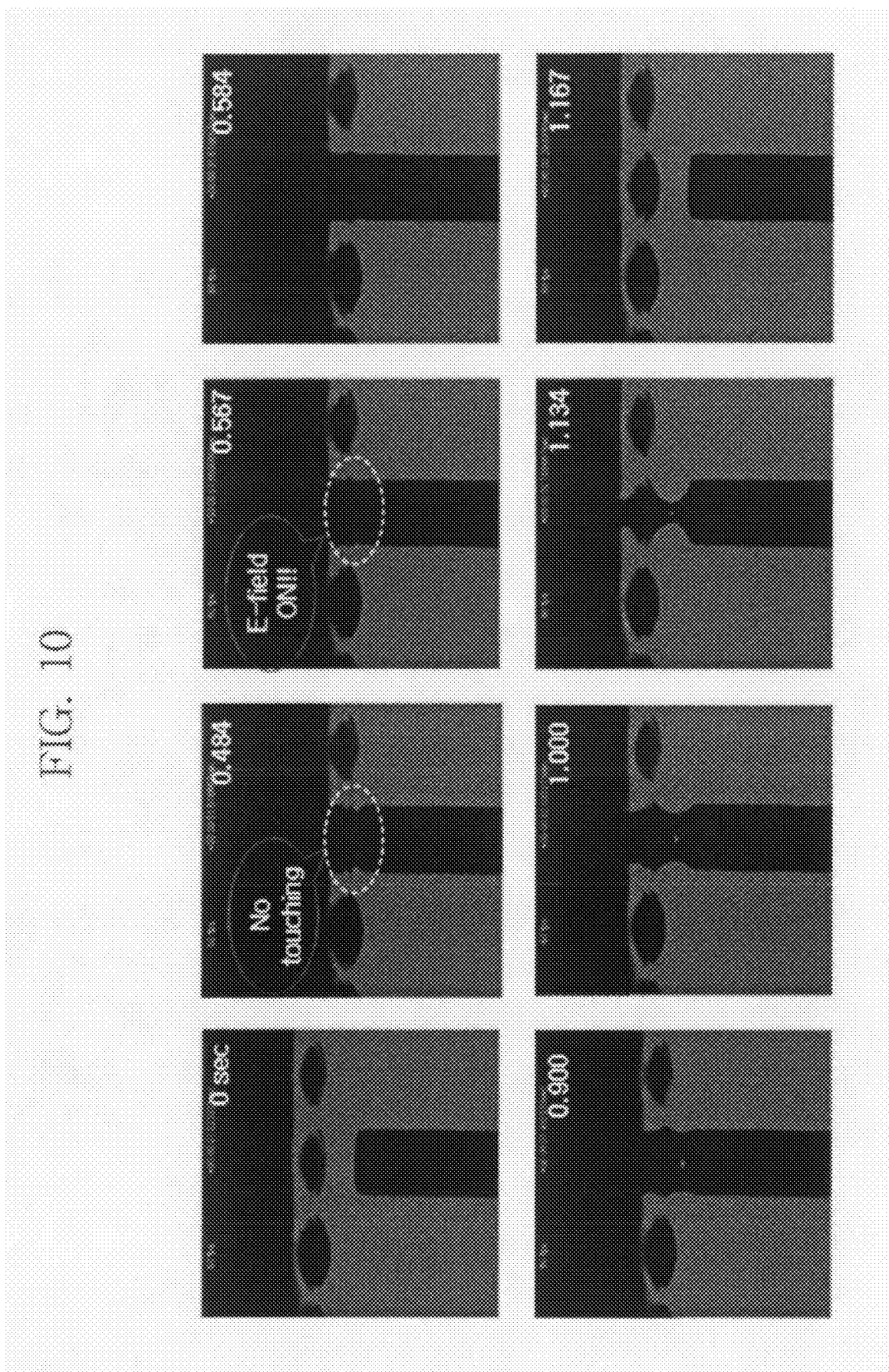
FIG. 10 is a series of photographic images illustrating an exemplary process of ejecting a droplet over time in the droplet ejection apparatus.

FIG. 10 is a series of photographic images illustrating an exemplary method of ejecting a droplet using the droplet ejection apparatus of the first exemplary embodiment. The number on the top right corner of each image indicates the time when the photo is taken, which is calculated from the time when the substrate 30 starts to move. The bar-shaped object in the middle of each image is the upper end of the capillary nozzle 10. FIG. 10 shows the formation of a liquid bridge after a voltage is applied and the breakup of the liquid bridge into a new droplet.

Figure 11:
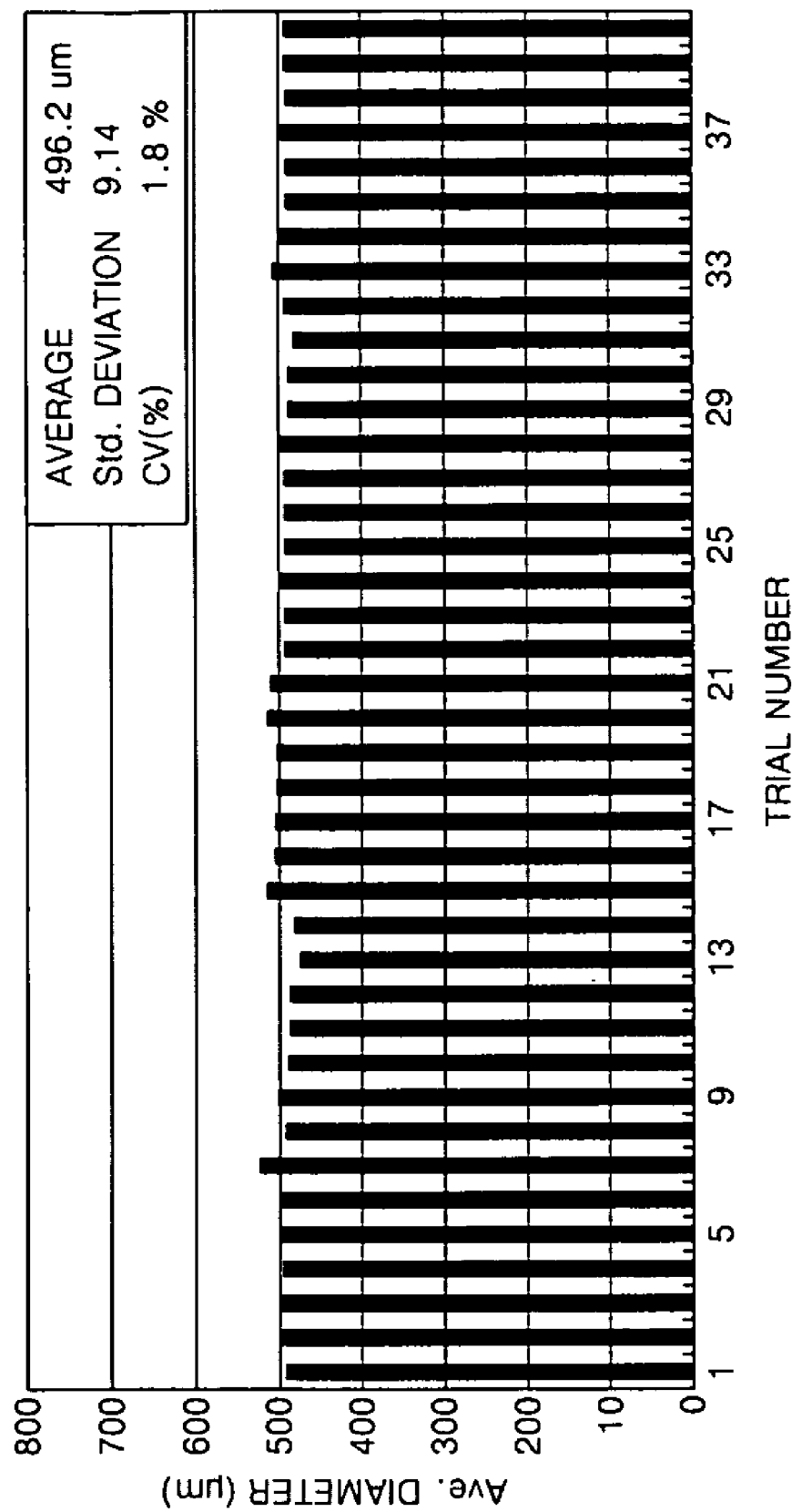
FIG. 11 is a diagram illustrating a distribution of droplet diameters of droplets repetitively printed by an exemplary droplet ejection apparatus.

FIG. 11 is a diagram illustrating the distribution of droplet diameters of droplets repetitively printed in the droplet ejection apparatus of the first exemplary embodiment. After repeating the operation of ejecting droplets 40 times under the same conditions, as described with reference to FIG. 8, as illustrated in FIG. 11, the apparatus of the first exemplary embodiment exhibited consistent and reliable performance. Specifically, droplets with an average diameter of about 496.2 micrometers ($\mu$m), with a standard deviation of about 9.14 and a coefficient of variation (CV, %) of droplet diameters of about 1.8% were obtained.

Figure 12:
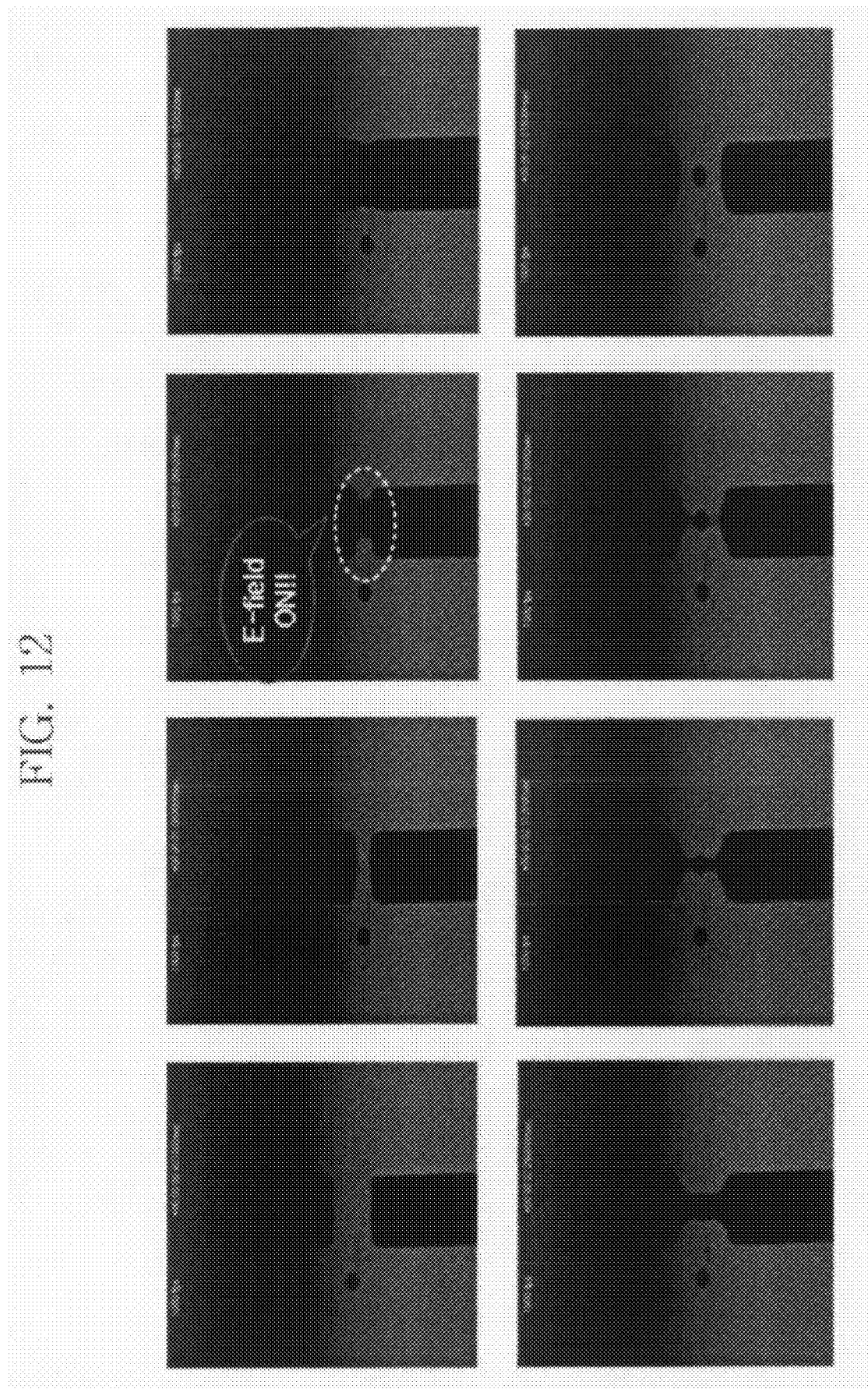
FIG. 12 is a series of photographic images illustrating a process of ejecting a droplet over time in the exemplary droplet ejection apparatus of FIG. 1 and an exemplary droplet ejection apparatus using an ultraviolet (UV) film-coated substrate.

FIG. 12 is a series of photographic images illustrating the process of ejecting a droplet over time in the droplet ejection apparatus of FIG. 1, and a droplet ejection apparatus using an ultraviolet (UV) film-coated substrate, according to a second exemplary embodiment. The droplet ejection apparatus according to the second exemplary embodiment has substantially the same configuration as the droplet ejection apparatus of the first exemplary embodiment except for the substrate. The UV film-coated substrate used in the second exemplary embodiment has a hydrophobic surface. Specifically, as is evident from FIG. 12, because the contact angle between the liquid and the surface of the substrate is large in the droplet ejection apparatus according to the second exemplary embodiment, the droplet ejected onto the substrate has a smaller diameter than that of the droplet shown in FIG. 10.

Figure 13:
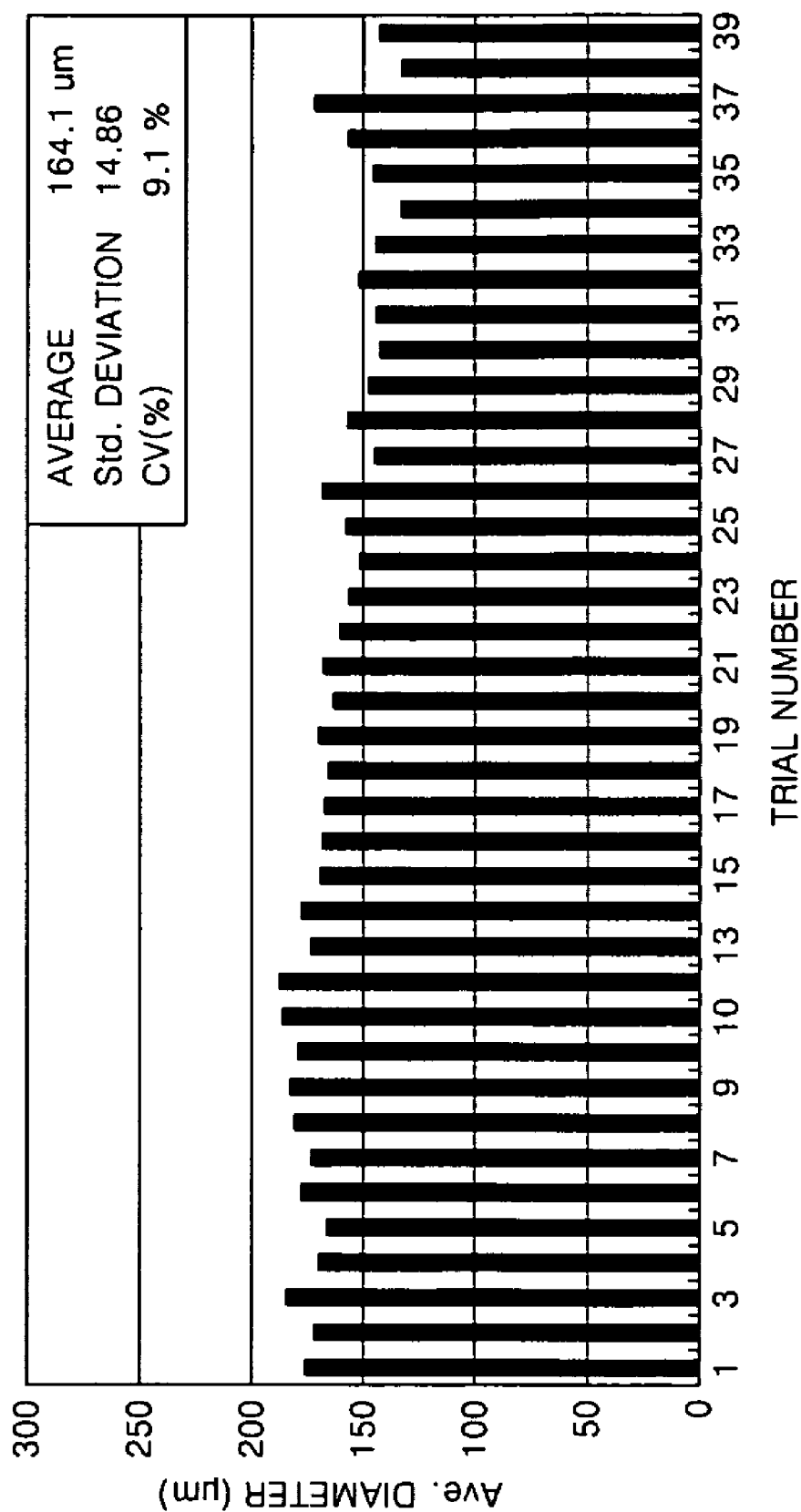
FIG. 13 is a diagram illustrating the distribution of droplet diameters of droplets repetitively printed using an exemplary droplet ejection apparatus.

FIG. 13 is a diagram illustrating a distribution of droplet diameters of droplets repetitively printed in the droplet ejection apparatus of the second exemplary embodiment. Referring to FIG. 13, the apparatus of the second exemplary embodiment exhibited good but lower performance than the apparatus of the first exemplary embodiment. Specifically, droplets with an average diameter of about 164.1 micrometers ($\mu$m), with a standard deviation of about 14.86 and coefficient of variation (CV, %) of droplet diameters of about 9.1% were obtained. In view of the foregoing, the disclosed embodiments allow ejection of droplets onto the surface of various kinds of substrates.

A method of adjusting the size of droplets using a droplet ejection apparatus and a method according to disclosed embodiments will now be described with reference to FIG. 14.

Figure 14:
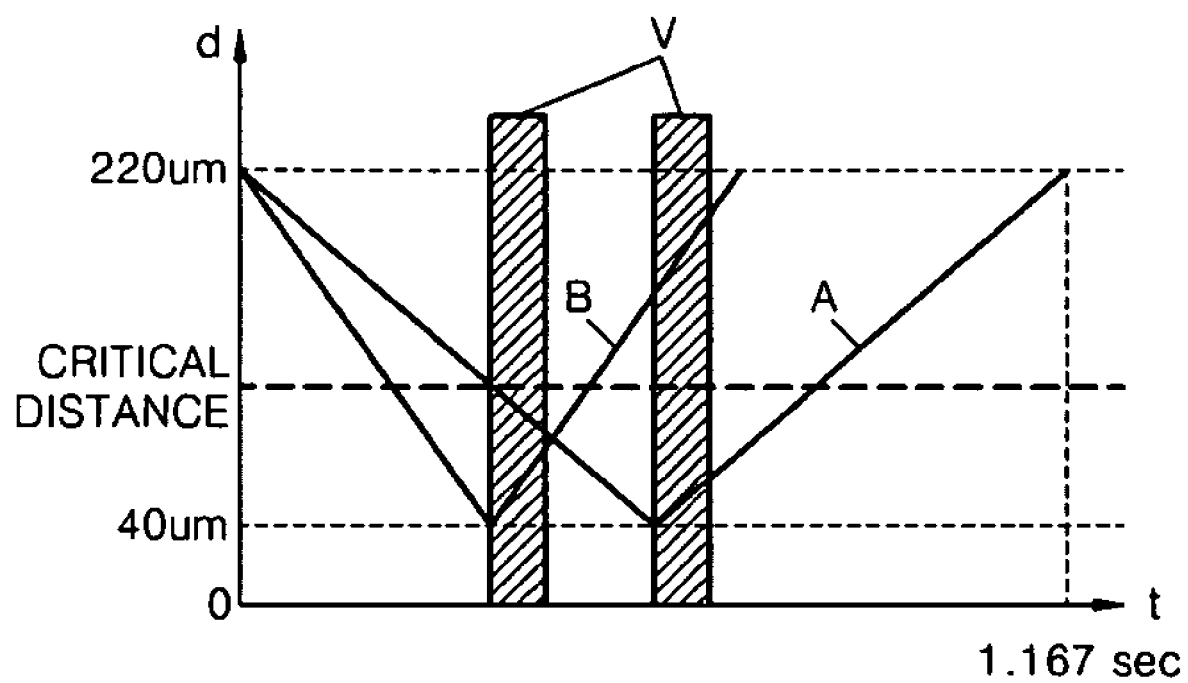
FIG. 14 is a graph illustrating two operating conditions that can be used to obtain droplets with different diameters.

FIG. 14 is a graph illustrating two operating conditions that can be used for obtaining droplets with different diameters, respectively. Condition A indicates that a substrate moves from a first position to a second position at low speed. Condition B indicates that the substrate moves from the first position to the second position at high speed. The rest of the conditions are the same as described in the first exemplary embodiment.

Figure 15A:
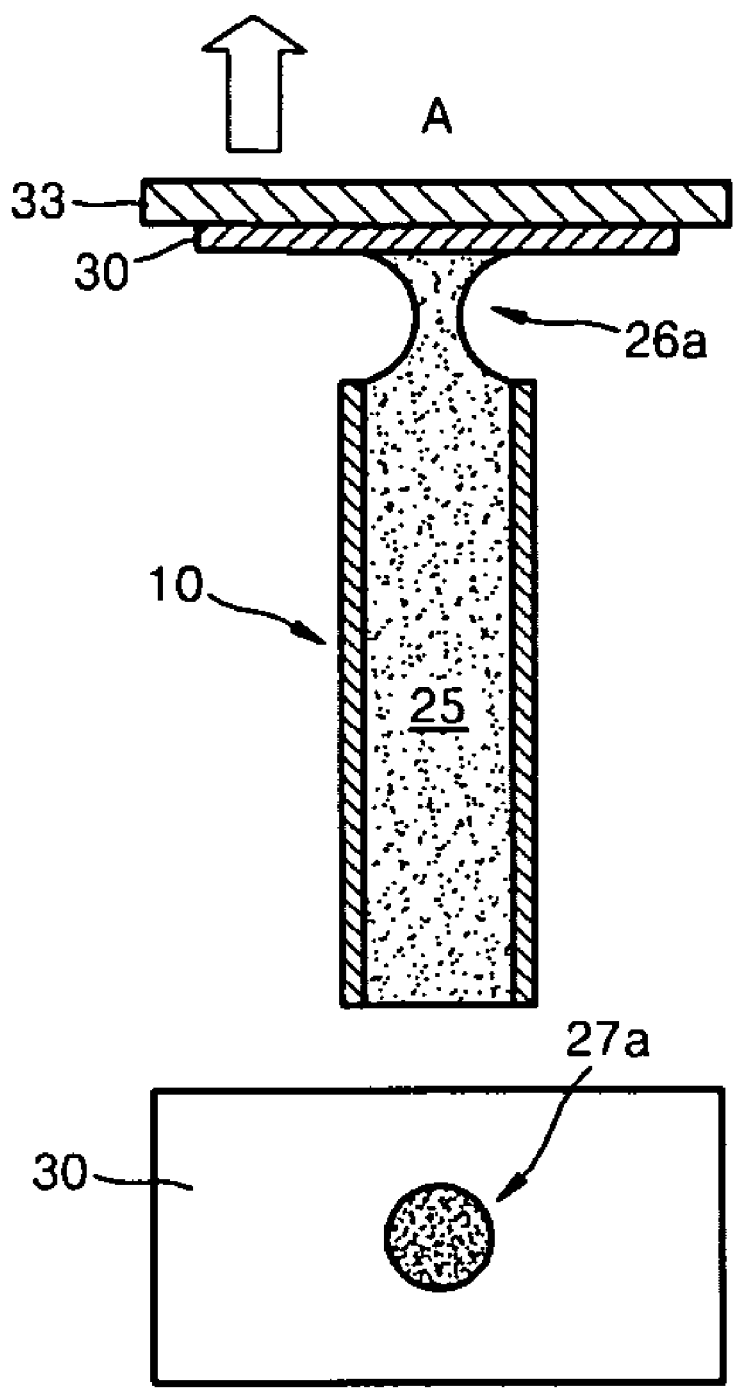
FIGS. 15A and 15B illustrate droplets printed according to the two operating conditions illustrated in FIG. 14.
Figure 15B:
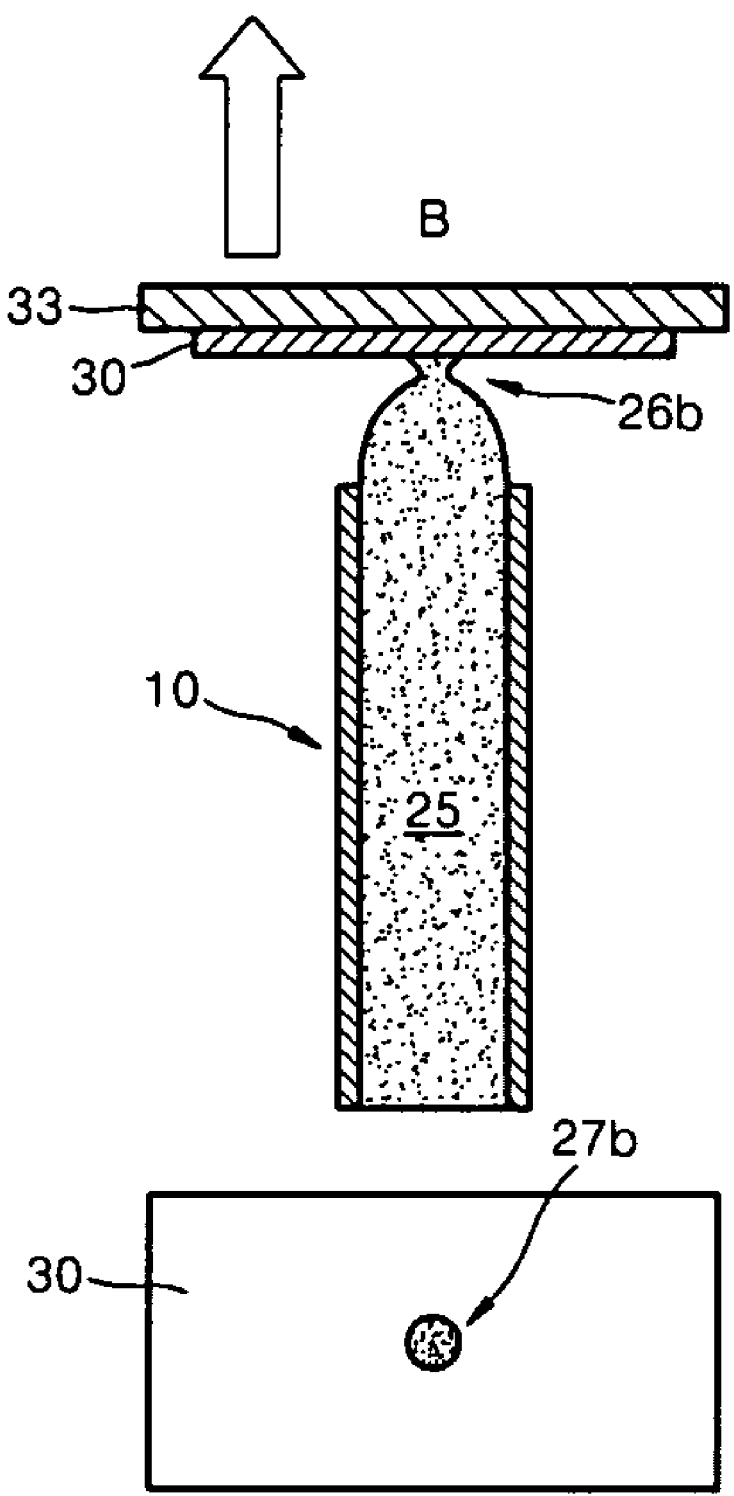

FIGS. 15A and 15B illustrate droplets printed according to the two operating conditions illustrated in FIG. 14. As illustrated in FIG. 15A, when the substrate 30 moves from a first position to a second position at low speed, a liquid is ejected on to a wide area on the substrate 30 so that a large droplet 27a is printed On the other hand, as illustrated in FIG. 15B, when the substrate 30 moves from the first position to the second position at high speed, the liquid is ejected on to a small area on the substrate 30 so that a small droplet 27b is printed.

As described above, an apparatus and method for ejecting droplets, according to the exemplary embodiments, uses electrical charge concentration between a capillary nozzle and a substrate and liquid bridge breakup, thus providing excellent repeatability and reproducibility without being significantly affected by electrical characteristics of a liquid to be printed on the substrate.

The disclosed embodiments also enable ejection of droplets with different sizes without the need to change nozzles while allowing printing of droplets at a desired position on the substrate.

While the disclosed embodiments have been particularly shown and described with reference to exemplary embodiments thereof, it will be understood by those of ordinary skill in the art that various changes in form and details can be made therein without departing from the spirit and scope of the disclosed embodiments as defined by the following claims.

In addition, many modifications can be made to adapt a particular situation or material to the disclosed teachings without departing from the essential scope thereof. Therefore, it is intended that the disclosure not be limited to the particular embodiment disclosed as the best mode contemplated, but that the disclosure will include all embodiments falling within the scope of the appended claims.

What is claimed is:

1. An apparatus, comprising:
a reservoir which stores a liquid;
a capillary nozzle including a lower portion disposed inside the reservoir and an upper portion disposed outside the reservoir, wherein the capillary nozzle transfers the liquid from a lower end of the capillary nozzle to an upper end of the capillary nozzle using capillary force;
a potentiostat in electrical communication with the liquid;
a substrate mount;
a substrate disposed under the substrate mount and adjacent to the upper end of the capillary nozzle; and
a distance adjusting unit which reciprocatingly moves the substrate between a first position and a second position with respect to the capillary nozzle,
wherein the first position is a position where a distance between the upper end of the capillary nozzle and the surface of the substrate is less than an effective distance and the second position is a position where the distance between the upper end of the capillary nozzle and the surface of the substrate is greater than the effective distance, and
wherein the effective distance is a maximum distance a liquid bridge can form due to charge concentration between the capillary nozzle and the substrate when a voltage is applied to the liquid.

2. The apparatus of claim 1, wherein the distance adjusting unit sequentially moves the substrate to the second, first, and second positions with respect to the capillary nozzle and the potentiostat applies a voltage when the substrate is located at a position between the first position and a position corresponding to the effective distance.

3. The apparatus of claim 1, wherein the reservoir and the capillary nozzle are fixed and the distance adjusting unit moves the substrate mount to adjust the distance between the substrate and the capillary nozzle.

4. The apparatus of claim 1, wherein the substrate mount is fixed and the distance adjusting unit moves the reservoir and the capillary nozzle to adjust the distance between the substrate and the capillary nozzle.

5. The apparatus of claim 1, wherein the distance adjusting unit comprises a speed-controllable motor.

6. The apparatus of claim 1, wherein the capillary nozzle comprises a non-conductive material and the potentiostat applies a voltage to the liquid through an electrode, and wherein the electrode is in electrical communication with the liquid.

7. The apparatus of claim 1, wherein the capillary nozzle comprises a conductive material and the potentiostat is in electrical communication with the capillary nozzle.

8. The apparatus of claim 1, wherein the capillary nozzle comprises a non-conductive material and comprises a conductive material layer formed on an inside wall thereof and the potentiostat is in electrical communication with the conductive material layer.

9. The apparatus of claim 1, wherein the capillary nozzle extends upward from the reservoir and the substrate is disposed facing the upper end of the capillary nozzle.

10. The apparatus of claim 1, further comprising a plurality of capillary nozzles arranged in one reservoir, wherein the potentiostat applies a voltage to the liquid through an electrode, and the electrode in electrical communication with the liquid in the reservoir.

11. The apparatus of claim 1, wherein the liquid contains a nucleic acid, a protein, a bio cell, a virus, a bacteria or a combination comprising at least one of the foregoing biomolecules.

12. An apparatus comprising:
a plurality of droplet ejecting modules, each of the plurality of droplet ejecting module comprising:
a reservoir which stores a liquid;
a capillary nozzle including a lower portion disposed inside the reservoir and an upper portion disposed outside the reservoir, wherein the capillary nozzle transfers the liquid from a lower end of the capillary nozzle to an upper end of the capillary nozzle using a capillary force,
wherein a height of an upper end of one capillary nozzle of the plurality of droplet ejecting modules is substantially a same as a height of an upper end of another capillary nozzle of the plurality of droplet ejecting modules;
a potentiostat in electrical communication with the liquid;
a substrate mount;
a substrate disposed under the substrate mount and adjacent to the upper ends of the capillary nozzle; and a distance adjusting unit, which reciprocatingly moves the substrate between a first position and a second position with respect to the capillary nozzle, wherein the first position denotes a position where the distance between the upper end of the capillary nozzles nozzle and the surface of the substrate is less than a effective distance, and the second position is a position where the distance between the upper end of the capillary nozzle and the surface of the substrate is greater than the effective distance, and wherein the effective distance is a maximum distance a liquid bridge can form due to charge concentration between the capillary nozzle and the substrate when a voltage is applied to the liquid.

13. The apparatus of claim 12, wherein the distance adjusting unit sequentially moves the substrate to the second, first, and second positions with respect to the capillary nozzle and the potentiostat applies a voltage when the substrate is located at a position between the first position and a position corresponding to the effective distance.

14. The apparatus of claim 12, wherein the plurality of droplet ejecting modules are fixed and the distance adjusting unit moves the substrate mount to adjust the distance between the substrate and the capillary nozzle.

15. The apparatus of claim 12, wherein the substrate mount is fixed and the distance adjusting unit moves the plurality of droplet ejecting modules to adjust the distance between the substrate and the capillary nozzle.

16. The apparatus of claim 12, wherein the capillary nozzle of the each of the plurality of droplet ejecting modules comprises a non-conductive material and the potentiostat is in electrical communication with an electrode, and the potentiostat applies a voltage to the liquid through an electrode, and wherein the electrode is in electrical communication with the liquid.

17. The apparatus of claim 12, wherein the capillary nozzle of the each of the plurality of droplet ejecting modules comprises a conductive material and the potentiostat is in electrical communication with the capillary nozzle.

18. The apparatus of claim 12, wherein the capillary nozzle of the each of the plurality of droplet ejecting modules comprises a non-conductive material and comprises a conductive material layer, the conductive material layer formed on an inside wall of the capillary nozzle, and the potentiostat is in electrical communication with the conductive material layer of the capillary nozzle.

19. The apparatus of claim 12, wherein the capillary nozzle of the each of the plurality of droplet ejecting modules extends upward from the reservoir of the each of the plurality of droplet ejecting modules and the substrate is disposed facing the upper end of the capillary nozzle, and wherein the substrate is disposed above the plurality of droplet ejecting modules.

20. The apparatus of claim 12, wherein the each of the plurality of droplet ejecting modules comprises a plurality of capillary nozzles arranged in the reservoir of the each of the plurality of droplet ejecting modules and the potentiostat applies a voltage to the liquid in the reservoir of the each of the plurality of droplet ejecting modules through an electrode, and wherein the potentiostat is in electrical communication with the electrode and the electrode is in electrical communication with the liquid.

21. The apparatus of claim 12, wherein the liquid contains a nucleic acid, a protein, a bio cell, a virus, a bacteria or a combination comprising at least one of the foregoing biomolecules.

* * * * *